United States Patent Office 3,398,099
Patented Aug. 20, 1968

3,398,099
FLUORESCENT EUROPIUM CHELATES
Marcos Kleinerman, Southbridge, Mass., assignor, by mesne assignments, to American Optical Company, Southbridge, Mass., a corporation of Delaware
No Drawing. Filed Dec. 28, 1964, Ser. No. 421,634
9 Claims. (Cl. 252—301.2)

ABSTRACT OF THE DISCLOSURE

A chemical composition consisting of a europium chelate wherein 3 of 4 of the ligand portions are derived from β-diketones and the remaining ligand from either 1,10-phenanthroline or 2,2-bipyridyl. The resulting compounds have use and application in paints and surface coating whereby improved fluorescent properties will be attained.

---

The field of this invention is that of fluorescent europium chelates and the invention relates more particularly to novel europium chelates having improved fluorescence and stability characteristics.

It is known that certain europium chelates are capable of light emission such as fluorescence. As a result of this property, such chelate materials are useful in surface coatings, paints and the like and are also of considerable interest in laser developments and applications. However, it is also known that europium chelates having desirable fluorescence properties are characterized by low stability and tend to dissociate under even gentle heating to form other chelate materials and the like of much less desirable fluorescence properties.

It is an object of this invention to provide improved fluorescent europium chelates; to provide such chelate materials having desirable fluorescence properties; and to provide such chelate materials having increased stability.

It is also an object of this invention to provide improved fluorescent europium chelates which are adapted to exhibit their desirable fluorescence properties independently of the solvents or matrix materials in which they are disposed; to provide such chelate materials which can be dissolved in a wide variety of solvents while retaining good fluorescence properties; and to provide such chelate materials which can be established in various plastic materials without loss of their desirable fluorescence properties.

It is a particular object of this invention to provide novel fluorescent europium chelates which feature a narrow energy emission band in which most of the energy emission of the materials occurs.

How these and other objects of this invention are accomplished will become apparent with reference to the following detailed description of preferred embodiments of the invention.

In this regard, it will be recognized that the fluorescent europium chelates previously known embody four ligands derived from β-diketones for each europium ion and that, as described in the commonly owned, copending application of Marcos Kleinerman, Ser. No. 364,022, filed Apr. 30, 1964, the most desirable fluorescence properties of the chelates are achieved in the presence of Lewis bases which are preferably employed as solvents for the chelates. Three of the β-diketone ligands are relatively strongly bound to the europium ion in the chelate material by one covalent bond and one coordinate bond, the coordinate bond referring to the electrostatic bond existing in the chelate between europium ion and an oxygen atom of the β-diketone ligand. The fourth β-diketone ligand is less strongly bound to the europium ion by two coordinate bonds. The relatively low stability of chelates characterized by the presence of four β-diketone ligands is manifested by the fact that the less strongly bound β-diketone ligand can be removed from the chelate by heating at reduced pressure to form the six-bonded chelate of lower fluorescence properties.

In accordance with this invention, europium chelates are prepared embodying three ligands derived from β-diketones and one ligand derived from a compound selected from a group of nitrogen-containing compounds having two nitrogen atoms available for intramolecular electrostatic or coordinate bonding. In these chelates, each of the β-diketone ligands is bound to the europium ion by one covalent bond and one coordinate bond formed between the europium ion and the oxygen atoms of the β-diketone ligands. The nitrogen-containing ligand is bound within the chelate by two coordinate bonds of significant strength formed between the europium ion and the nitrogen atoms of the ligand.

Various β-diketone ligands can be embodied in europium chelates of this invention including ligands derived from dibenzoylmethide (DBM) (1,3 diphenyl propane, 1,3 dione), benzoylacetone (BA) (1 phenyl butane, 1,3 dione), thenoyltrifluoroacetone (TTA), 1,1,1-trifluoroacetylacetone (TFA), 1,1,1,5,5,5-hexafluoroacetylacetone (HFA), dibenzoylamine (DBA), benzoyltrifluoroacetone (BTFA) and furoyltrifluoroacetone (FTFA). The chelates can include three identical β-diketone ligands, if desired, or can embody various combinations of three β-diketone ligands for each europium ion (Eu) in the chelate within the scope of this invention.

The nitrogen-containing ligands embodied in the europium chelates of this invention include ligands derived from 1,10 phenanthroline (Phen.), 2,2' bipyridyl (Bipyr.) and alkyl-substituted or aryl-substituted derivatives of 1,10 phenanthroline and 2,2' bipyridyl. In the 1,10 phenanthroline derivatives, the alkyl or aryl groups are preferably substituted in one or more of positions 4, 5, 6 and 7. The 2,2' bipyridyl derivatives preferably have alkyl and aryl groups substituted in one or both of positions 4 and 4'. That is, the phenanthroline-based ligands embodied in chelates according to this invention are derived from phenanthroline-based compounds having the formula

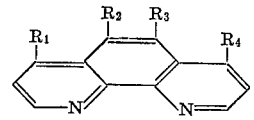

wherein $R_1$, $R_2$, $R_3$ and $R_4$ are selected from the group consisting of alkyl groups, aryl groups and hydrogen atoms. The bipyridyl-based ligands useful in the chelates of this invention are derived from compounds having the formula

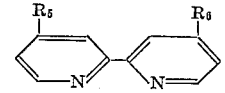

wherein $R_5$ and $R_6$ are selected from the group consisting of alkyl groups, aryl groups and hydrogen atoms.

Specific fluorescent europium chelates provided by this invention are as follows:

Europium thenoyltrifluoroacetone bis-trifluoroacetylacetone phenanthroline—Eu TTA (TFA)$_2$ Phen.
Europium tris-thenoyltrifluoroacetone phenanthroline—Eu (TTA)$_3$ Phenanthroline
Europium thenoyltrifluoroacetone bis-1,1,1,5,5,5-hexafluoroacetylacetone phenanthroline—Eu TTA (HFA)$_2$ Phen.

Europium tris-dibenzoylmethide phenanthroline—Eu (DBM)₃ Phen.
Europium tris-trifluoroacetylacetone phenanthroline—Eu (TFA)₃ Phen.
Europium dibenzoylmethide bis-1,1,1-trifluoroacetylacetone phenanthroline—Eu DBM (TFA)₂ Phen.
Europium tris-benzoylacetone phenanthroline—Eu (BA)₃ Phen.
Europium-tris-thenoyltrifluoroacetone 4,7 diphenyl phenanthroline—Eu (TTA)₃ 4,7 diphenyl Phen.
Europium thenoyltrifluoroacetone bis-dibenzoylamine phenanthroline—Eu TTA (DBA)₂ Phen.

The fluorescence lifetimes and approximate fluorescence yields of these crystalline chelate materials are set forth in Table I.

TABLE I

| | Lifetime (milliseconds) | | Yield (Percent) |
|---|---|---|---|
| | 300° K. | 77° K. | 300° K. |
| Eu (TTA) (TFA)₂ Phen | .71 | .77 | Over 80 |
| Eu (TTA)₃ Phenanthroline | .80 | .80 | Over 80 |
| Eu TTA (HFA)₂ Phen | | | |
| Eu (TFA)₃ Phen | .81 | .83 | |
| Eu (DBM)₃ Phen | .40 | .43 | |
| Eu DBM (TFA)₂ Phen | | | |
| Eu (BA)₃ Phen | .53 | .51 | |
| Eu (TTA)₃ 4,7 diphenyl Phen | | | |
| Eu TTA (DBA)₂ Phen | .82 | .82 | Over 80 |
| Eu TTA (DBA)₂ Phen. (in polymethyl methacrylate) | .57 | .64 | |

One means for preparing the europium chelates provided by this invention is to dissolve europium acetate in a small volume of dimethylsulfoxide with a slight excess of the selected β-diketone compound or compounds and with corresponding amount of the selected nitrogen-containing compound as described above. Water is then added, and the solution is preferably heated with stirring, to precipitate the chelate. The precipitated chelate is then filtered, washed with water and recrystallized from methanol. Other means for preparing the chelates of this invention will be recognized by persons skilled in the art.

The europium chelates provided by this invention display good fluorescence properties when irradiated with ultraviolet light even at room temperatures. The chelates are adapted to fluoresce in the visible spectrum with a red-orange color and feature a very narrow emission bond less than 30 Angstroms wide at half of peak emission. Most of the total emission of the chelate occurs within this band. In addition, the novel chelates are marked by good stability and retain their desirable fluorescence properties even at elevated temperatures up to 80° C. The chelate materials also display desirable fluorescence properties when incorporated in a suitable transparent solvent or in a transparent liquid, solid or glassy carrier such as alcohol, aromatic, saturated hydrocarbon, or other conventional organic solvent, an epoxy resin or a suitable acrylic plastic. For example, chelates provided by this invention have been embodied in polystyrene, in polymethyl methacrylate, in copolymers of cyclohexyl methacrylate and polymethyl methacrylate and in copolymers of allyl diglycol carbonate and methyl methacrylate without significant reduction in the fluorescence properties of the chelate materials. These europium chelates are useful in surface coatings, paints and the like and are also of considerable interest in laser developments and applications.

It should be understood that although particular europium chelates have been described above by way of illustration, this invention also includes other modifications and equivalents thereof within the scope of the appended claims.

I claim:
1. A fluorescent europium chelate having four ligands bound to an europium ion, said ligands comprising three ligands derived from β-diketone compositions selected from the group consisting of dibenzoylmethide, benzoylacetone, thenoyl-trifluoroacetone, 1,1,1-trifluoroacetylacetone, 1,1,1,5,5,5-hexafluoroacetylacetone, dibenzoylamine, benzoyltrifluoroacetone and furoyltrifluoroacetone and one ligand derived from a nitrogen-containing compound selected from the group consisting of 1,10 phenanthroline and 2,2′ bipyridyl.

2. A fluorescent composition consisting of a europium chelate in a carrier, said chelate consisting essentially of four ligands bound to a europium ion, said ligands comprising three ligands derived from β-diketones compositions selected from the group consisting of dibenzoylmethide, benzoylacetone, thenoyl-tri-fluoroacetone, 1,1,1-trifluoroacetylacetone, 1,1,1,5,5,5 - hexafluoroacetylacetone, dibenzoylamine, benzoyltrifluoroacetone and furoyltrifluoroacetone and one ligand derived from a nitrogen containing compound selected from the group consisting of 1,10, phenanthroline and 2,2′bipyridyl.

3. A fluorescent composition as set forth in claim 2 wherein said carrier comprises a solvent for said europium chelate.

4. A fluorescent composition as set forth in claim 2 wherein said carrier comprises a solid, transparent plastic material.

5. A fluorescent composition as set forth in claim 2 wherein said carrier comprises an acrylic plastic.

6. A fluorescent composition as set forth in claim 2 wherein said carrier comprises polystyrene.

7. A fluorescent composition as set forth in claim 2 wherein said carrier comprises polymethyl methacrylate.

8. A fluorescent composition as set forth in claim 2 wherein said carrier comprises a copolymer of cyclohexyl methacrylate and polymethyl methacrylate.

9. A fluorescent composition as set forth in claim 2 wherein said carrier comprises a copolymer of allyl diglycol carbonate and methyl methacrylate.

References Cited

UNITED STATES PATENTS 3,225,307  12/1965  Weissman _____ 252—301.2

FOREIGN PATENTS 1,344,970  10/1963  France.

OTHER REFERENCES

Crosby et. al., Fluorescence in Nitrogen Heterocyclic Complexes of Rare Earth Ions, IBM Technical Disclosure Bulletin, vol. 6, No. 7, December 1963.

Ohlmann et. al., Florescence Properties of Europium Dibenzoylmethide and Its Complexes with Lewis Bases, the Journal of Chemical Physics, May 1964, vol. 40, No. 10.

TOBIAS E. LEVOW, *Primary Examiner.*

R. D. EDMONDS, *Assistant Examiner.*